July 13, 1965   O. M. ARNOLD ETAL   3,194,416
ROTARY POSITIONING DEVICE
Filed Feb. 7, 1962   3 Sheets-Sheet 1

INVENTOR.

BY
Curtis, Morris & Safford
ATTORNEYS

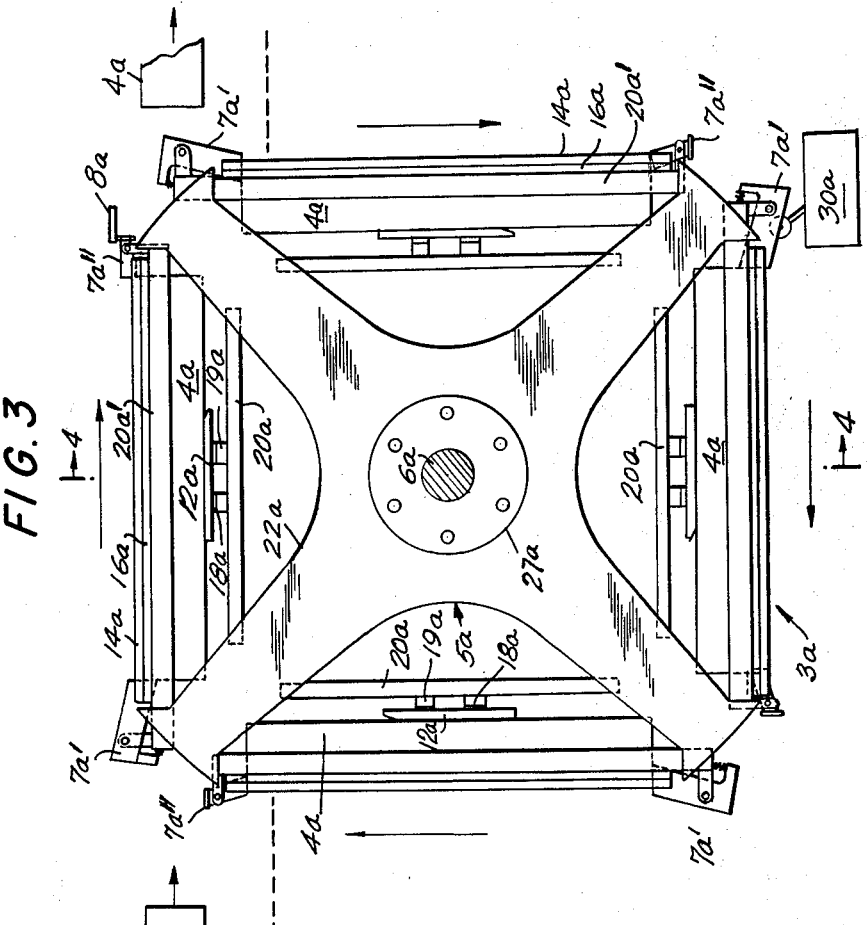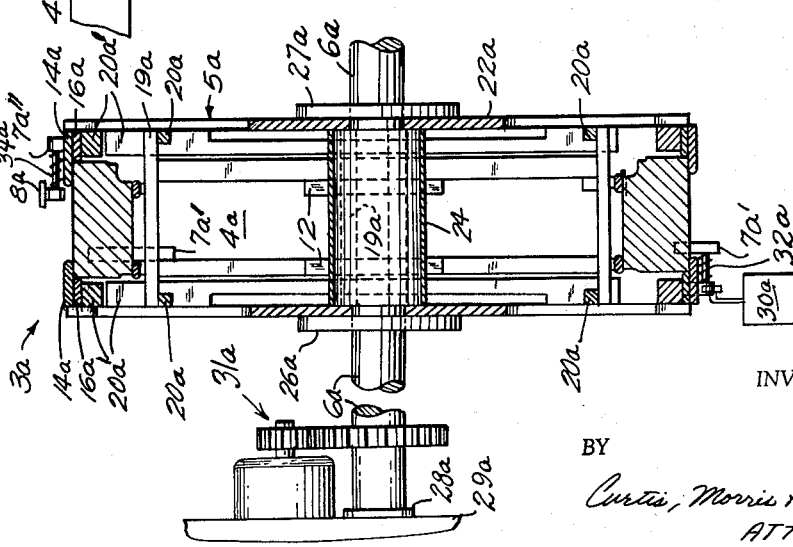

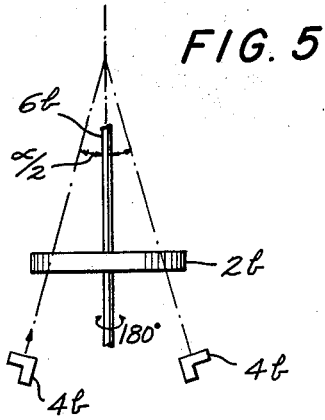
FIG. 5
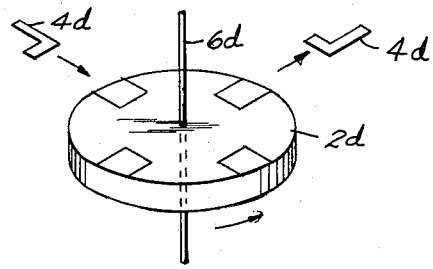
FIG. 8
FIG. 6
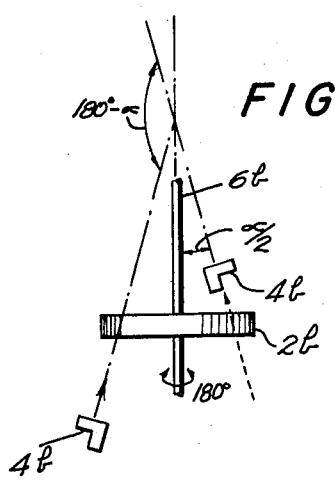
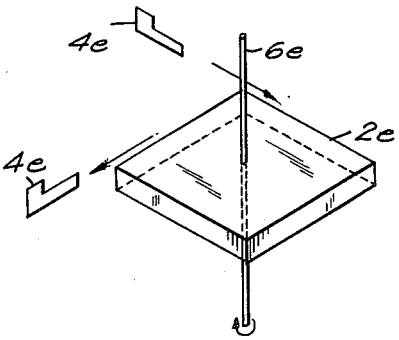
FIG. 9
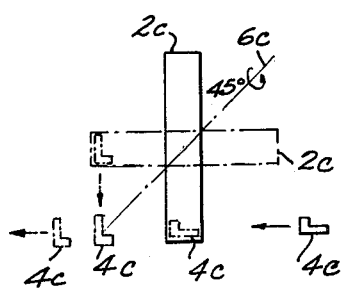
FIG. 7

United States Patent Office 3,194,416
Patented July 13, 1965

3,194,416
ROTARY POSITIONING DEVICE
Orlan M. Arnold, Grosse Pointe Park, and Emil Umbricht, Northville, Mich., assignors to Ajem Laboratories, Inc., Livonia, Mich.
Filed Feb. 7, 1962, Ser. No. 171,662
9 Claims. (Cl. 214—1)

The present invention relates to methods and apparatus for surface treatment of manufactured articles, including particularly heavy castings and machined parts, and to apparatus for tilting them to one or more advantageous angles while in transit along a processing line, and then returning them for required further treatment or delivery from the processing line.

In many mass-production type industrial operations it is necessary to provide for cleaning or deburring or other surface treatment of articles in the process of manufacture. This has often been efficiently accomplished by automatic power washers and liquid grit-blasting machines. Complete cleaning of articles, such as the machined castings soiled with chips or casting sand and cutting oils is made difficult by complex configurations and intricate internal passages. The treatment of such parts involves exposing the part of the article to be treated at an optimum angle for impinging a liquid abrasive blast, or a jet of washing or rinsing liquid and also requires drainage as complete as possible. The type of machines described herein embodying the present invention is adapted to rotate the articles to such optimum angle for each of one or more treatments along the processing line and to return them to the initial, or some new attitude for discharge.

In the preferred embodiments described herein, an article is sequentially transferred from the preceding processing station into one of the article carriers of the turret and rotated, up and down, horizontally, or at any angle, by the turret through one or more desired positions where sprays and/or blasts of air, or other process is performed upon it at this station, and then the article is returned to its normal attitude, or a new one, and is transferred on to another station or delivered from the process line.

Among the many advantages of the device described is that by turning the article to a good drainage angle, the expense of using high pressure heated air for drying is substantially reduced or even done away with. Better impingement of liquids also results from good drainage, so that selective cleansing of particular areas of an article can be more readily accomplished. This is especially true when there is simultaneous drainage, so that no pockets of retained liquid remain to obstruct efficient cleansing.

A further advantage of this device is its relatively low space requirements, both as to actual space occupied by each machine, and also as to the number of machines required, because of greater efficiency, accomplished more effective operation within a given space. For example, while numerous articles are being rotated through various processing stations, they can also simultaneously be turned over end for end, and sideways, or both at some compound angle. They can be delivered back to the processing line in a new physically-oriented attitude; or they can even be delivered to another processing line at an angle to the former line. All these diversified motions are here obtained by a relatively simple device. Both width and length dimensions can be reduced by use of this device.

Devices embodying the present invention are particularly adaptable to washing by spray impingement or by immersion impingement or both, simultaneously or successively on different articles, with complete drainage between.

Other advantages of this device are its adaptability to different types of transfer mechanisms for positioning articles into and removing them from the article carriers of the device, and its ability to discharge an article directly from one such device to a similar device without the need for an intermediate space-consuming rest position.

Herein are set forth illustrative embodiments of the present invention, in which the articles to be treated are sequentially transferred directly from the main processing line into article carriers arranged radially, tangentially, or at an angle along the periphery of a rotary-article-tipping device. The articles are generally locked, each in its own carrier, and are intermittently or continuously rotated out from the processing line in a "side-trip" of 360° or less through various processing stages, where washing, abrasive deburring, rinsing, drying and draining, or the like take place, and then on to a position where the articles are transferred out of said carriers back to a continuation of the main processing line, perhaps in a new special attitude if the side trip is less than 360°.

This invention can advantageously be adapted to use with various transfer mechanisms, preferably with the improved type disclosed in the copending application by ourselves and our co-workers, namely, Serial No. 50,138, filed August 17, 1960.

The various features and further advantages will be more easily understood by a consideration of the following description of the illustrative embodiments of our invention in conjunction with the drawings, in which, FIGURE 1 is a side elevation of radial, rotary-transfer and tilting device with an in-line transfer device for a processing line shown only by fragments as one preferred embodiment of the present invention;

FIGURE 3 is a side elevation of a tangential, second embodiment of this invention;

FIGURE 4 is a view in vertical section of the device in FIGURE 3, taken along line 4—4 in FIGURE 3;

FIGURE 5 is a schematic plan view of a rotary-transfer-and-tilting device for turning over and redirecting articles, out of the same side of the device, along a new processing path at an angle, $\alpha$, to the feed path and for carrying them through fluid impingement positions, a third embodiment;

FIGURE 6 is a schematic plan view of a device, similar to that in FIGURE 5 except that in this fourth embodiment the articles are delivered to a processing line from the opposite side of the device from which they were received and to a continuation of the processing line which is at an angle, $180° - \alpha$, with first part of the line;

FIGURE 7 is a schematic view of a fifth embodiment of a rotary-transfer-and-tilting device, in which the axis of rotation of said device is in a plane which also contains the axis of travel along the processing line preceding the device, and inclined at 45° to said axis of travel in said plane and in which the carrier device itself is mounted at about 45° to its axis, with the result that the device, when rotated through 180°, moves from one position (e.g. as shown in full lines in FIGURE 7) to another position perpendicular thereto and inverted (as indicated in phantom outline) and thereby carrying an article 4c up to the position where it is shown in broken lines. From there it can be lowered back down to the processing line but onto its previously leading end;

FIGURE 8 is a diagrammatic perspective view of a radial, transfer device, a sixth embodiment of the present invention, shown with its axis vertical, but which could have its axis tilted to give special tilting effects;

FIGURE 9 is a similar diagrammatic perspective view of a tangential rotary-transfer device, a seventh embodiment;

Although the present invention is shown in several preferred embodiments, it should be understood that they are illustrative, for instructing others in the practical use of the invention and its principles, so that they may be enabled to modify it and adapt it in numerous other forms, each as may be best suited to the conditions of a particular use.

Figure 1:
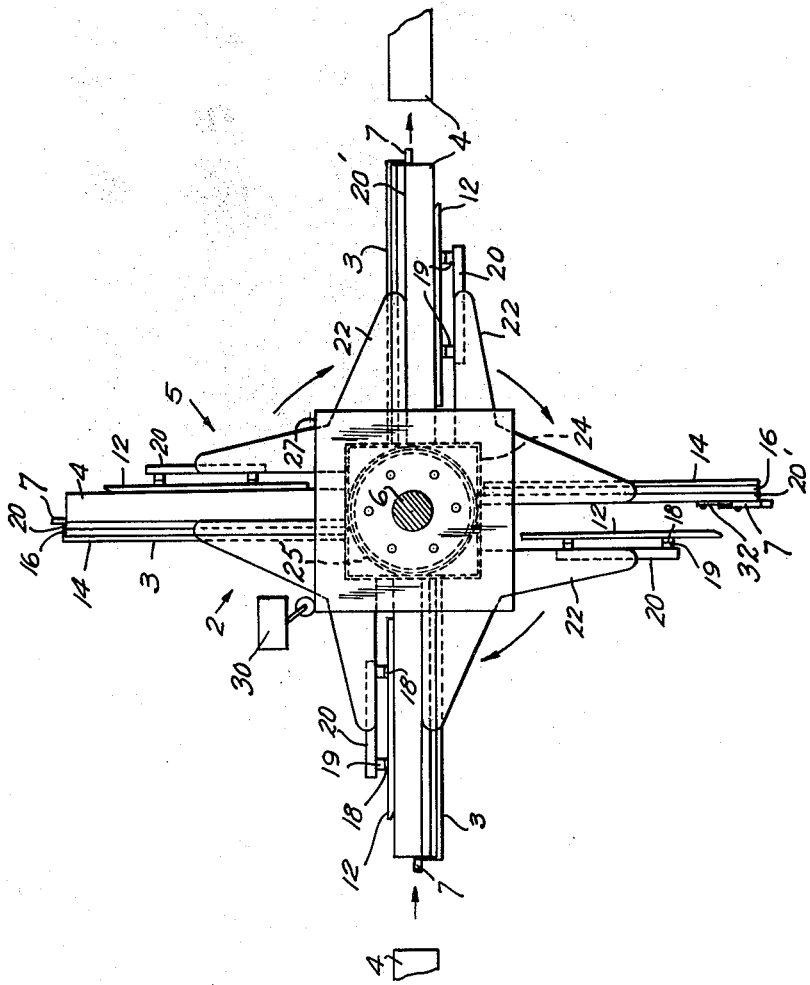
Figure 2:
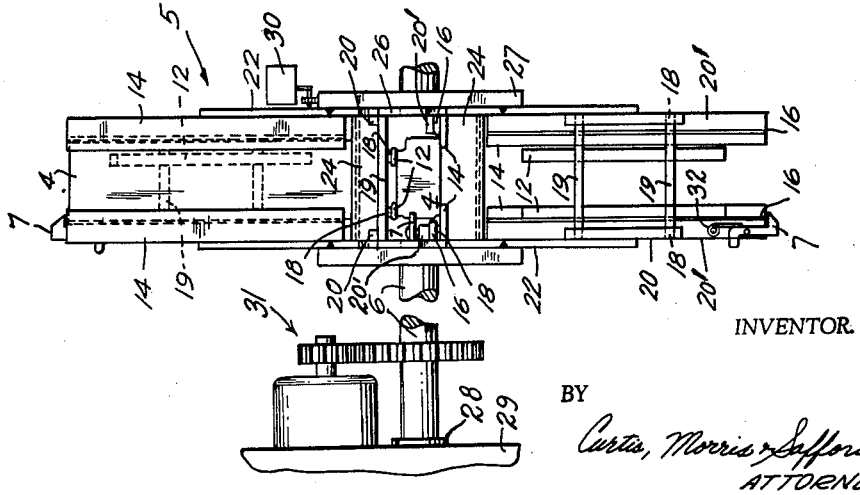
FIGURE 2 is an end elevation of the device in FIGURE 1.

In the present drawings the first preferred embodiment disclosed in FIGURES 1 and 2 is a rotary-positioning device 2 having four article carriers 3 which receive and hold the articles 4, here shown in outline form as an automobile engine head. The article carriers 3 are mounted on side frames 5 (i.e. the means 5 for supporting the article carriers 3), which are secured to a center axle shaft or bearing 6 by which the device is rotatably mounted on the processing apparatus, e.g., on a machine frame or housing of usual design and construction.

Each carrier 3 in this first embodiment is a cradle type having parallel guide bars 12 and 14 above and below the article, and side rails 16, all of which support the article 4. Spacers 18 are shown between the bars 12 and cross bars 19 and between the left-hand bars 14 and the left-hand side rails 16 (see FIGURE 2). The cross bars 19 and the side rails 16 in turn are secured to the upper and lower anchoring bars 20 and 20' respectively, which in turn are secured to the side plates 22.

Frame 5 is made of several pieces welded together: Angle plates 22, at each side for each quadrant, cradle end plates 24 and circular hub 25 (see FIGURE 1) extending between opposite plates 22 and axle seat plates 26 (see FIGURE 2). Squared flanges 27 are bolted to axle seat plates 26 whereby axles 6 are mounted to frame 5. The axles 6 are mounted in bearings 28 in the frame 29 of the machine (see FIGURES 2 and 4). Drive means 31 is connected to one of the axles 6 to rotate the device 2.

In this first embodiment the articles 4 are transferred from the processing line radially into the horizontal carriers 3 in turn, after which each article is rotated in the device 2 to, or through, overhead jet impingement and/or drainage with changing angles. At 180° of rotation the article is delivered upside-down and end-for-end to an in-line transfer means, e.g., for continuation of the processing. Control means 30 for the indexing cycle in this first embodiment stops rotation at every 90° to permit, e.g., article transfer in and out and overhead jet impingement to occur simultaneously to three different articles at three of the article carriers.

No latching or special holding device is required in this embodiment to hold the article on the carrier 3. At the loading station, it slides into the carrier until it abuts against article end plate 24. As the carrier rotates, its open end lifts above plate 24 so that gravity holds the article in position. At the 180° station it is again horizontal so that the article can be readily slid off to the continuation of the processing line.

Various modifications can be incorporated in this first embodiment thereby extending its useful application, without departing from the scope of this invention. For example, a greater or smaller number of radially held carriers could be used. Holding means 7 with springs 32 can be provided at the outer ends of carriers 3, as described below for other embodiments, to secure an article or articles, which then can be rotated down through an immersion impingement, or through 360° and then transferred back out at the same place where they came in, thus attaining a greater variety of drainage angles. The article carriers need not be the cradle-like structures as shown in FIGURES 1–4, but can be vise-like or chuck-like, or spindles which insert into and lock onto the articles, in short, any carrier capable of holding the articles on the rotating device. Also the carrier may be rotated over and back instead of around and around, but there is advantage both in continuous rotation and in delivery remote from the loading point.

The second preferred embodiment is disclosed in FIGURES 3 and 4 wherein structures similar to that in the first embodiment are designated by the same numbers followed by the letter "a." This second embodiment is similar to the first in that it rotates the parts away from the processing line and back, but it is different in that its article carriers 3a are oriented chordally to the path of rotation about the axle 6a, and the articles 4a are locked in place within said carriers 3a by holders 7a' and 7a'' during rotation. The result of this latter difference is that the articles 4a are presented for transferral on, in the same physical orientation as they had when delivered to rotor 2a.

The entrance holders 7a' are pivotally mounted on the respective anchoring bars 20a', while the exit holders 7a'' are pivotally mounted diagonally across the other ends of similar anchoring bars 20a'. Springs 32a and 34a normally keep holders 7a' and 7a'' in their closed, or latched, positions. Entrance holder 7a' is pushed open as the article 4a slides onto the article carrier 3a, and it snaps into locking position behind the article when fully in position. Exit holder 7a'' is opened by holder release 8a to enable the transfer means (not shown) to remove an article 4a from the carrier 3a.

As with the first embodiment, there is a wide variety of modifications which may be incorporated into this second embodiment without departing from the scope of this invention. For example, the articles 4a could be delivered into the lowest carrier 3a with the result that the articles 4a would be discharged above, rather than below, the level of the initial processing line.

Still another embodiment of the present invention is disclosed by FIGURES 5 and 6. In this third embodiment the axle 6b is mounted on the line that bisects α, the angle between the processing line and its continuation (or as in FIGURE 6, mounted on the line that bisects 180°−α, its supplement). The article carriers (not shown in this figure) are mounted in the periphery of the device 2b at an angle of α/2 to the axle 6b. The receiving and delivering positions of the carriers (separated by 180° of rotation) are in the same axial plane. In this third embodiment the articles 4b upon being transferred out of the rotating carrier device 2b are upside down, but not rotated end for end.

A fourth embodiment of this invention is shown in FIGURE 7 to illustrate that not only is the axle 6 in the invention always at an angle to the processing line but it may also be at some angle other than 90° to the rest of the device 2. As shown in FIGURE 7 the article carrier is at an angle of 45° with the axle 6c which, in turn, is in the same plane with the feed path but 45° to said path. The device 2c receives the article 4c from the feed line and, upon rotating 180° positions the article 4c as shown in broken lines.

From here it may be moved back to a continuation of the processing line (as indicated by the vertical arrow) or it can be moved off on the higher level in any desired direction.

FIGURES 8 and 9 illustrate how the first and second embodiments can be varied to perform different duties. In these figures the embodiments are rotating about a vertical axis instead of a horizontal one as disclosed in the first four figures. Among the advantages to be gained by such horizontal rotation is rotation end for end of the article and/or accommodation to a turn in the processing line.

Although specific embodiments of the invention have been herein shown and described, it is to be understood that they are not exhaustive, but, on the contrary, are illustrative for purposes of explanation and to aid others in practicing the invention and in adapting it and modifying its embodiments for a variety of conditions of practical use.

We claim:
1. In an apparatus for treatment of heavy castings and like articles by means of a fluid medium having transfer means, a device for turning from a processing line to an advantageous angle at least one of the articles being treated, said device comprising article carrier means adapted to carry such articles during tipping previously received from and thereafter delivered to said transfer means, means for supporting said article carrier means at an angle to the axis of rotation, which axis is at an angle to the processing line, drive means for actuating said device rotationally to turn such articles carried therein, holding means for securing said articles in said carrier means, respectively, to prevent them from sliding longitudinally along said carrier means, means for releasing said holding means to facilitate removal of said articles from said carrier means, and means for controlling the sequence of operation of the rotation cycle.

2. In an apparatus for treatment of heavy castings and like articles by means of a fluid medium having transfer means, a device for sequentially rotary indexing the articles being treated from a processing line to an advantageous angle, said device comprising a machine frame, an axle shaft rotatably mounted on said machine frame at right angles to the processing line, article carrier support means mounted on said axle shaft and perpendicular to it, a plurality of article carriers, each connected to said support means, each positioned to extend radially along its longitudinal axis from said shaft and each comprising a plurality of guide bars parallel to its longitudinal axis and defining an enclosure therebetween for supporting an article therein received from and thereafter delivered to said transfer means, holding means for securing the articles in said carriers, respectively, while they are being indexed to prevent them from sliding longitudinally along said carriers, means for releasing said holding means adapted to operate synchronously with the indexing cycle, drive means for actuating said device rotatively to index such articles carried therein, and control means for said indexing cycle.

3. In an apparatus for treatment of heavy castings and like articles by means of a fluid medium having transfer means, a device for sequentially rotary indexing the articles being treated from a processing line to an advantageous angle, said device comprising a machine frame, an axle shaft rotatably mounted on said machine frame at right angles to the processing line, article carrier support means mounted on said axle shaft and perpendicular to it, a plurality of article carriers, each connected to said support means, each with its longitudinal axis oriented tangentially to said shaft and each comprising a plurality of guide bars parallel to its longitudinal axis and defining an enclosure therebetween for supporting an article therein received from and thereafter delivered to said transfer means, holding means for securing the articles in said carriers, respectively, while they are being indexed to prevent them from sliding longitudinally along said carriers, means for releasing said holding means adapted to operate synchronously with the indexing cycle, drive means for actuating said device rotatively to index such articles carried therein, and control means for said indexing cycle.

4. In an automatic power washer for heavy castings and like articles having transfer means, a device for sequentially rotary indexing the article being treated from a processing line to an advantageous tipped attitude and back to the continuation of the processing line which is at an angle to the former portion, said device comprising a machine frame, an axle shaft mounted on said machine frame along a line that bisects the angle between the processing line and its continuation, article carrier support means mounted on said shaft and perpendicular to it, a plurality of article carriers each connected to said support means each positioned to align its longitudinal axis with the processing line when adjacent to said line and each comprising a plurality of guide bars parallel to its longitudinal axis and defining an enclosure therebetween for supporting an article therein received from and thereafter delivered to said transfer means, drive means for actuating said device rotatively to index such articles carried therein, and control means for said indexing cycle.

5. In an automatic power washer for heavy castings and like articles having transfer means, a device for sequentially rotary indexing the article being treated from a processing line to an advantageous tipped attitude and back to the continuation of the processing line which is at an angle to the former portion, said device comprising a machine frame, an axle shaft mounted on said machine frame along a line that bisects the angle between the processing line and its continuation, article carrier support means mounted on said shaft and perpendicular to it, a plurality of article carriers each connected to said support means each positioned to align its longitudinal axis with the processing line when adjacent to said line and each comprsing a plurality of guide bars parallel to its longitudinal axis and defining an enclosure therebetween for supporting an article therein received from and thereafter delivered to said transfer means, holding means for securing the articles in said carriers, respectively, while they are being indexed to prevent them from sliding longitudinally along said carriers, means for releasing said holding means adapted to operate synchronously with the indexing cycle, drive means for actuating said device rotatively to index such articles carried therein, and control means for said indexing cycle.

6. In an automatic power washer for heavy castings and like articles having transfer means, a device for sequentially rotary indexing the article being treated from a processing line to an advantageous tipped attitude and back to the continuation of the processing line which is at an angle to the former portion, said device comprising a machine frame, an axle shaft mounted on said machine frame along a line that bisects the supplement of the angle between the processing line and its continuation, article carrier support means mounted on said shaft and perpendicular to it, a plurality of article carriers each connected to said support means, each positioned to align its longitudinal axis with the processing when adjacent to said line and each comprising a plurality of guide bars parallel to its longitudinal axis and defining an enclosure therebetween for supporting an article therein received from at an end and thereafter delivered upside down to said transfer means from the opposite end of said article carrier, drive means for actuating said device rotatively to index such articles carried therein, and control means for said indexing cycle.

7. In an automatic power washer for heavy castings and like articles having transfer means, a device for sequentially rotary indexing the article being treated from a processing line to an advantageous tipped attitude and back to the continuation of the processing line which is at an angle to the former portion, said device comprising a machine frame, an axle shaft mounted on said machine frame along a line that bisects the supplement of the angle between the processing line and its continuation, article carrier support means mounted on said shaft and perpendicular to it, a plurality of article carriers each connected to said support means, each positioned to align its longitudinal axis with the processing line when adjacent to said line and each comprising a plurality of guide bars parallel to its longitudinal axis and defining an enclosure therebetween for supporting an article therein received from at an end and thereafter delivered upside down to said transfer means from the opposite end of said article carrier, holding means for securing the articles in said carriers, respectively, while they are being indexed to prevent them from sliding longitudinally along said carriers, means for releasing said holding means adapted to operate synchronously with the indexing cycle, drive means for actuating said device rotatively to index such articles carried therein, and control means for said indexing cycle.

8. In an apparatus for treatment of heavy castings and like articles by means of a fluid medium having transfer means, a device for sequentially rotary indexing the articles being treated from a processing line to an advantageous angle comprising a machine frame, an axle shaft rotatably mounted on said machine frame at 45° to the processing line, support means mounted on said axle shaft, article carrier means mounted on said support means to align with the processing line while in the receiving position, holding means for securing the article in said article carrier means to prevent an article from sliding longitudinally along its carrier means, means for releasing said holding means adapted to operate synchronously with the indexing cycle to deliver said article back to the transfer means after a 180° rotation to the delivery attitude, drive means for actuating said device rotatively to index such articles carried therein, and control means for said indexing cycle.

9. In an apparatus for treatment of heavy castings and like articles by means of a fluid medium having transfer means, a device for rotating in a horizontal plane at least one of the articles being treated comprising article carrier means adapted to carry such articles during rotation previously received from and thereafter delivered to said transfer means, article carrier support means mounted so as to rotate said carrier means in a horizontal plane, drive means for actuating said device rotatively to index such articles carried therein, and control means for said indexing cycle.

References Cited by the Examiner
UNITED STATES PATENTS

| | | |
|---|---|---|
| 933,354 | 9/09 | Aab. |
| 1,336,028 | 4/20 | Fentress _____ 198—22 X |
| 1,489,926 | 4/24 | Burtchaell _____ 198—25 |
| 1,559,618 | 11/25 | Kappes _____ 198—25 |
| 1,626,410 | 4/27 | Halstead. |
| 1,935,891 | 11/33 | Schroeder _____ 198—25 |
| 2,538,408 | 1/51 | Baker _____ 198—25 X |
| 2,758,725 | 8/56 | Collyer. |
| 2,918,071 | 12/59 | Umbricht _____ 134—153 X |
| 3,031,339 | 4/62 | Regan _____ 118—56 X |
| 3,055,490 | 9/62 | Anderson _____ 198—25 |

FOREIGN PATENTS 817,849   8/59   Great Britain.

HUGO O. SCHULZ, *Primary Examiner.*

UNITED STATES PATENT OFFICE
CERTIFICATE OF CORRECTION

Patent No. 3,194,416                         July 13, 1965

Orlan M. Arnold et al.

It is hereby certified that error appears in the above numbered patent requiring correction and that the said Letters Patent should read as corrected below.

Column 6, lines 41 and 42, after "processing" insert -- line --.

Signed and sealed this 5th day of April 1966.

(SEAL)
Attest:

ERNEST W. SWIDER                         EDWARD J. BRENNER
Attesting Officer                            Commissioner of Patents